Dec. 25, 1923.  D. E. BROWN  1,478,728
ARTIFICIAL TREE
Filed June 27, 1923
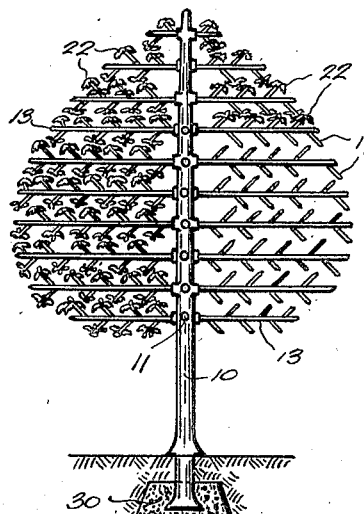
FIG. 1
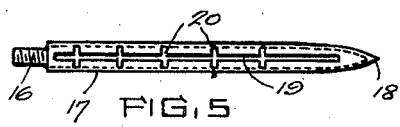
FIG. 5
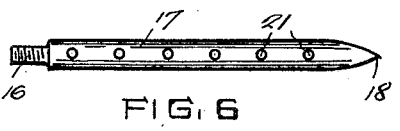
FIG. 6
FIG. 7
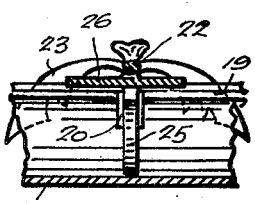
FIG. 8
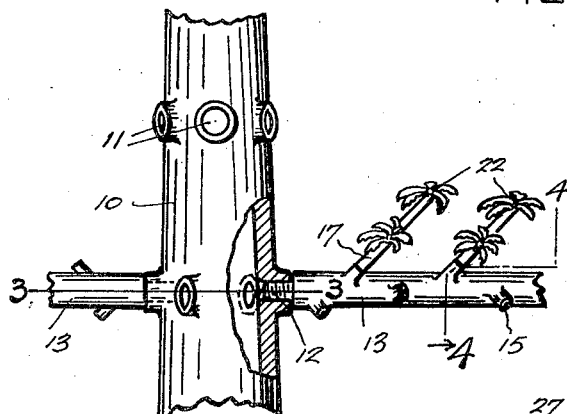
FIG. 2
FIG. 3
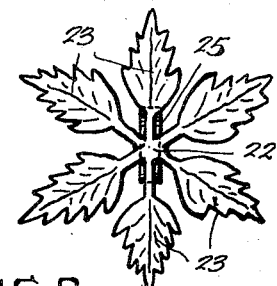
FIG. 9
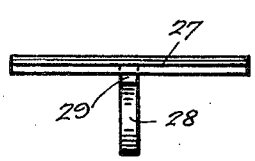
FIG. 10
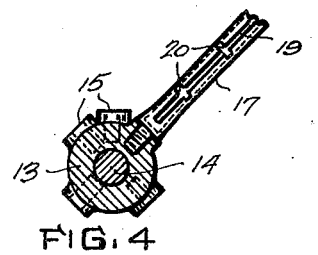
FIG. 4
INVENTOR,
DALTON E. BROWN
By, Shigley & Harney
ATTORNEYS Patented Dec. 25, 1923.

1,478,728

UNITED STATES PATENT OFFICE.

DALTON E. BROWN, OF LANCASTER, OHIO.

ARTIFICIAL TREE.

Application filed June 27, 1923. Serial No. 648,082.

*To all whom it may concern:*

Be it known that I, DALTON E. BROWN, a citizen of the United States of America, residing at Lancaster, in the county of Fairfield and State of Ohio, have invented certain new and useful Improvements in Artificial Trees, of which the following is a specification.

My present invention relates generally to artificial trees, and more particularly to an artificial tree primarily intended for permanent ornamental use outdoors, my object being the provision of a device of this nature which will promote many advantages over natural growing trees and will avoid many of the known disadvantages, and a further object is the provision of a simple inexpensive construction made up of standardized readily interchangeable parts whereby repairs and substitutions may be easily and quickly effected.

In the accompanying drawing which illustrates my present invention and forms a part of this specification, Figure 1 is a side view showing the practical mounting of my invention, the tree being partly denuded of leaf twigs, Figure 2 is an enlarged side view, partly broken away and in section, of a portion of the tree trunk and certain of the limbs, Figure 3 is a horizontal section through the tree trunk taken substantially on line 3—3 of Figure 2, Figure 4 is a cross section through one of the limbs taken substantially on line 4—4 of Figure 2, Figures 5 and 6 are respectively a top and bottom plan view of one of the branches, Figures 7 and 8 are respectively a transverse and longitudinal section through a portion of one of the branches showing leaf twigs therein, Figure 9 is a top plan view of one of the leaf twigs removed, and Figure 10 is a side elevation of one of the leaf twig spacers.

Referring now to these figures my invention proposes an artificial tree including an elongated tapering and preferably hollow trunk 10, which may be formed of cast metal with a plurality of internal threaded sockets 11 integral therewith and projecting slightly therefrom in order that these sockets may cooperate with any suitable surface ornamentation representative of various forms of bark in order to simulate as near as possible the appearance of a natural growing tree trunk.

Within the several sockets 11 which are preferably staggered as shown in Figures 2 and 3 in particular, the reduced inner threaded ends 12 of the limbs 13 are adapted to screw, these limbs being of various lengths so that the tree may be shaped as desired, each limb being either solid as will probably be the case with the shorter smaller limbs, or hollow with or without an inner reinforcing rod such as seen at 14 in Figure 4, it being contemplated that at least the larger longer limbs may like the tree trunk be formed of cast iron.

In either event the limbs 13 are provided with series of angularly outstanding internally threaded sockets 15 staggered therearound to receive the reduced threaded inner ends 16 of branches 17, the latter of which are, as particularly shown in Figures 7 and 8, of hollow formation, having their outer ends 18 closed as seen in Figures 5 and 6 and having longitudinal slots 19 extending for approximately the full length thereof and intersected by spaced cross slots 20. The lengthwise slots 19 of the branches 17 are so placed that when the branches are threaded in connection with the limbs 13 the slots 19 will come uppermost, each branch having a lengthwise series of apertures 21 the series being in diametrical opposition to the slot 19 so that moisture finding its way into the branches through the slots 19 may freely drain from the openings 21.

The slots 19 and 20 provide for the reception and retention of leaf twigs generally indicated at 22, each leaf twig having a series of radiating leaves 23 which may be stamped or otherwise pressed from thin sheet metal and secured to the upper reduced neck 24 of a disk 25 capable of insertion in one of the cross slots 20 so that the reduced neck 24 can move along the lengthwise slots 19 of the branches for adjustment in this way to various points of the branches. Each leaf twig has a cap plate 26 curved to overlie a portion of the branch to which it is to be adjusted and the several leaf twigs may be adjusted and held by spacers 27 having disks 28 with reduced neck portions 29 capable of insertion in the cross slots 20 and of adjustment in the lengthwise slots 19 similar to the leaf twigs themselves.

In this way various different formations as regards the finished ornamental tree may be effected, the numbers of limbs and branches being capable of wide variation and it being of course not necessary to utilize all but rather a selected number of the supporting sockets of the tree trunk and limbs. It is also possible to considerably vary the limbs as to length and also the branches as to lengths and these variations together with judicious adjustment of the leaf twigs on the branches makes it possible to greatly vary the ultimate appearance of the tree especially in view of the wide range of choice as regards surface ornamentation including the painting of the trunk, limbs, branches and leaf twigs.

It is obvious that in so far as appearance and shade is concerned an artificial tree of this nature, securely mounted as by embedding the larger end of the trunk 10 in a concrete base 30 in the ground as shown in Figure 1 may be rendered equally advantageous with the natural product and that it will in addition have many advantages over the natural product inasmuch as when broken either in part or in whole it is capable of replacement at once, it may be redecorated whenever desired so as to perpetually present a good appearance, it will not attract bugs or diseases and its parts are capable of frequent rearrangement or readjustment.

I claim:

1. An ornamental artificial tree including a trunk having a plurality of threaded sockets staggered therearound, a plurality of limbs each having in its length threaded sockets staggered therearound and each having a reduced threaded extension at one end to screw into one of the threaded sockets of the trunk, a series of branches each having a reduced threaded extension at one end to screw into one of the sockets of the limbs, and a plurality of leaf twigs adjustable along the branches.

2. An ornamental artificial tree including a trunk having a plurality of threaded sockets staggered therearound, a plurality of limbs each having in its length threaded sockets staggered therearound and each having a reduced threaded extension at one end to screw into one of the threaded sockets of the trunk, a series of branches each having a reduced threaded extension at one end to screw into one of the sockets of the limbs, and a plurality of leaf twigs, said branches being hollow having lengthwise slots and said leaf twigs having clusters of stamped leaves and having means movable within the branches through the slots thereof for adjustably supporting the leaf twigs in place.

3. An ornamental artificial tree including a trunk having a plurality of threaded sockets staggered therearound, a plurality of limbs each having in its length threaded sockets staggered therearound and each having a reduced threaded extension at one end to screw into one of the threaded sockets of the trunk, a series of branches each having a reduced threaded extension at one end to screw into one of the sockets of the limbs, said branches being hollow and having longitudinal slots and spaced cross slots, and leaf twigs having clusters of stamped leaves and having disks movable in the hollow of the branches and shiftable therein through the cross slots, having reduced neck portions movable through the longitudinal slots.

4. An ornamental artificial tree including a trunk having a plurality of threaded sockets staggered therearound, a plurality of limbs each having in its length threaded sockets staggered therearound and each having a reduced threaded extension at one end to screw into one of the threaded sockets of the trunk, a series of branches each having a reduced threaded extension at one end to screw into one of the sockets of the limbs, said branches being hollow and having longitudinal slots and spaced cross slots, and leaf twigs having clusters of stamped leaves and having disks movable in the hollow of the branches and shiftable therein through the cross slots, having reduced neck portions movable through the longitudinal slots, and spacing members similarly movable in the hollows of the branches and through the longitudinal slots for holding leaf twigs in spaced apart relation.

5. An ornamental artificial tree including a trunk, limbs removably and interchangeably attached to the trunk, branches removably and interchangeably attached to the limbs, and leaf bearing twigs removably in connection with said branches and adjustable therealong.

6. An ornamental artificial tree including a trunk, limbs, branches and leaf twigs, the limbs being removably and interchangeably supported by the trunk and similarly supporting the branches, and the leaf twigs being adjustable lengthwise of the branches.

In testimony whereof I have affixed my signature.

DALTON E. BROWN.